United States Patent
Buglak et al.

(10) Patent No.: US 12,212,627 B1
(45) Date of Patent: Jan. 28, 2025

(54) MEASUREMENT OF USER ACTIVITIES ON COMMUNICATION PLATFORMS

(71) Applicant: Fivecast Pty Ltd, Kent Town (AU)

(72) Inventors: Rostyslav Buglak, Kent Town (AU); David Blockow, Kent Town (AU); Matthew Lowry, Kent Town (AU); Aaron Lane, Kent Town (AU); Brenton Cooper, Kent Town (AU)

(73) Assignee: Fivecast Pty Ltd, Kent Town (AU)

( * ) Notice: Subject to any disclaimer, the term of this patent is extended or adjusted under 35 U.S.C. 154(b) by 0 days.

(21) Appl. No.: 18/760,991

(22) Filed: Jul. 1, 2024

Related U.S. Application Data

(63) Continuation of application No. 17/263,967, filed as application No. PCT/AU2018/000196 on Oct. 15, 2018, now abandoned.

(30) Foreign Application Priority Data

Jul. 30, 2018 (AU) ................................ 2018902753

(51) Int. Cl.
*H04L 67/1396* (2022.01)
*G06Q 50/00* (2012.01)

(52) U.S. Cl.
CPC ......... *H04L 67/1396* (2022.05); *G06Q 50/01* (2013.01)

(58) Field of Classification Search
None
See application file for complete search history.

(56) References Cited

U.S. PATENT DOCUMENTS

| | | | |
|---|---|---|---|
| 8,108,455 B2 * | 1/2012 | Yeager | H04L 67/34 709/248 |
| 8,694,401 B2 | 4/2014 | Stewart | |

(Continued)

FOREIGN PATENT DOCUMENTS

| | | |
|---|---|---|
| AU | 2010306534 B2 | 8/2012 |
| CN | 106033575 A | 10/2016 |

(Continued)

OTHER PUBLICATIONS

Extended European Search Report and Written Opinion, Issued in EP Application No. 18928520.8, mailed Feb. 4, 2022, 9 pages.

(Continued)

*Primary Examiner* — Quang N Nguyen
(74) *Attorney, Agent, or Firm* — McDonnell Boehnen Hulbert & Berghoff LLP

(57) ABSTRACT

A method for determining a profile of an entity of interest, comprising interrogating a social media platform to determine a social media account corresponding to the entity of interest and generating a linked social network data structure linking the social media account corresponding to the entity of interest to one or more other social media accounts on the social media platform corresponding to other entities. The method further involves assigning an individual link measure to one or more of the individual links of the linked network data structure, the individual link measure based on an assessment of the one or more social media interactions upon which the individual link is based on and a profile of the entity of interest based on an aggregated measure based on the linked social network data structure comprising the individual link measures.

18 Claims, 13 Drawing Sheets

(56) References Cited

U.S. PATENT DOCUMENTS

| | | | |
|---|---|---|---|
| 9,049,117 B1* | 6/2015 | Nucci | ............ H04L 43/0811 |
| 9,300,676 B2 | 3/2016 | Madhu | |
| 2007/0005654 A1 | 1/2007 | Schachar | |
| 2009/0248465 A1 | 10/2009 | Recce | |
| 2012/0159647 A1 | 6/2012 | Sanin | |
| 2012/0226579 A1 | 9/2012 | Ha | |
| 2013/0238600 A1 | 9/2013 | Kindler | |
| 2014/0019264 A1 | 1/2014 | Wachman | |
| 2014/0164218 A1 | 6/2014 | Stewart | |
| 2017/0206557 A1 | 7/2017 | Abrol | |
| 2018/0152471 A1 | 5/2018 | Jakobsson | |
| 2019/0199744 A1* | 6/2019 | Nides | ............ H04L 63/0428 |
| 2019/0364117 A1* | 11/2019 | Rogynskyy | ............ G06F 16/273 |
| 2021/0397696 A1* | 12/2021 | Yarabolu | ............ G06F 21/554 |

FOREIGN PATENT DOCUMENTS

| | | |
|---|---|---|
| CN | 108616447 B | 9/2019 |
| KR | 20150092377 A | 8/2015 |

OTHER PUBLICATIONS

Marmanis, Haralambos, and Dmitry Babenko, Algorithms of the intelligent web. Greenwich: Manning, 2009.
Russell, Matthew A., Mining the social web: data mining Facebook, Twitter, Linkedin, Google+, GitHub, and more."O'Reilly Media, Inc.", 2013.
The International Search Report {ISR) with Written Opinion for PCT/AU2018/000196 dated Nov. 16, 2018, pp. 1-11.

* cited by examiner

MEASUREMENT OF USER ACTIVITIES ON COMMUNICATION PLATFORMS

CROSS-REFERENCE TO RELATED APPLICATIONS

The present application is a continuation of and claims priority to U.S. patent application Ser. No. 17/263,967, filed Jan. 28, 2021 and herein incorporated by reference in its entirety.

U.S. patent application Ser. No. 17/263,967 claims priority to Patent Cooperation Treaty (PCT) patent application no. PCT/AU2018/000196, filed Oct. 15, 2018 and herein incorporated by reference in its entirety.

PCT patent application no. PCT/AU2018/000196 claims priority to Australian provisional patent application no. 2018902753, filed Jul. 30, 2018 and herein incorporated by reference in its entirety.

TECHNICAL FIELD

The present disclosure relates to determining the risk profile of an entity having an associated online social media presence. In a particular form, the present disclosure relates to determining a risk profile of an entity based on their online relationships.

BACKGROUND

Determining the risk profile of entities such as a person, business, organisation or other groups is an important consideration in many areas of commercial and law enforcement activities. One example is characterising the risk profile of an entity to determine whether a commercial transaction should be entered into with the entity such as providing credit or an insurance policy.

In the area of national security, where entities are subject to a security vetting process that allows them to hold a security clearance or engage in activities with the law enforcement body or government, determining a risk profile is an important consideration as it allows an assessment to be made of the likelihood of future behaviour which may be problematical. Similarly, law enforcement can also be involved in providing "police" clearances where a cleared entity may be able to provide a range of services such as children related activities. Typically, this involves determining whether clearance should be provided based on past behaviour but it would be advantageous if likely future behaviour could be characterised in this assessment.

With the advent of the Internet, there is a wealth of potential data that is available online from entities particularly on social media platforms such as Reddit™, Google+™, Twitter™, LinkedIn™ and the like which could potentially form the basis of determining a risk profile. However, the number of entities of potential interest and the sheer volume of content that is available online, in addition to its constantly changing nature, makes this an extremely challenging task. In theory, the dynamically varying and inter-related nature of the content which is unique to social media platforms could be employed to monitor an entity's behaviour to determine whether they may be engaging in illegal activities or posing a threat to national security or if there is likelihood they may do so.

Analysts in the law enforcement and national security community are faced with the difficult problem of finding "the needle in the haystack" and they employ a range of manual processes to prioritise which potential threats should be further investigated. Increasingly, they are looking to online footprints, and the behaviours that might be manifested in the online footprint, as an early indicator of risk, however, with the number of persons of interest, and the sheer volume of online content, it is impractical for users to monitor all persons of interest.

It is against this background that there is therefore a need for tools to determine a risk profile that employs the special characteristics of the data available online from social media platforms.

SUMMARY

In a first aspect, the present disclosure provides a computer-implemented method for determining a risk profile of an entity of interest, comprising:
  interrogating by one or more electronic processors of a computer system a social media platform to determine a social media account corresponding to the entity of interest;
  generating by the one or more electronic processors a linked social network data structure linking the social media account corresponding to the entity of interest to one or more other social media accounts on the social media platform corresponding to other entities, wherein an individual link is based on one or more social media interactions between the social media account corresponding to the entity of interest and each of the one or more other social media accounts corresponding to other entities;
  assigning by the one or more electronic processors an individual link risk measure to one or more of the individual links of the linked network data structure, the individual link risk measure based on a risk assessment of the one or more social media interactions upon which the individual link is based on; and
  determining by the one or more electronic processors the risk profile of the entity of interest based on an aggregated risk measure based on the linked social network data structure comprising the individual link risk measures.

In another form, interrogating the social media account comprises:
  providing entity selection information characterising the entity of interest;
  interrogating the social media platform to identify one or more candidate social media accounts, each candidate social media account comprising candidate information;
  ranking the one or more candidate social media accounts based on a degree of similarity between the entity selection information and candidate information for each candidate social media account to provide a set of ranked candidate social media accounts; and
  selecting the social media account corresponding to the entity of interest from the set of ranked candidate social media accounts.

In another form, generating the linked social network data structure comprises:
  collecting data items from the social media account;
  determining data items corresponding to social media activities;
  determining social media interactions for the social media account based on the social media activities that relate to an interaction between the entity of interest and another social media account corresponding to another entity;

In another form, determining data items corresponding to social media activities includes comparing a data item with a previous version of a data item to identify a change in the data item.

In another form, determining social media interactions includes determining whether the social media account of the entity of interest and another social media account corresponding to another entity have interacted with common content on the social media platform.

In another form, the risk assessment is based on a textual analysis of the one or more social media interactions.

In another form, the textual analysis includes a measure of a relevance of the social media interaction in combination with a measure of a sentiment of the one or more social media interactions.

In another form, the risk assessment is based on an image analysis of the one or more social media interactions.

In another form, an initial entity risk measure is determined for each of the one or more other social media accounts linked to the social media account of the entity of interest.

In another form, the individual link risk measure for a link between the entity of interest and an other entity is also based on the initial entity risk measure for the other entity.

In another form, the method further includes interrogating by the one or more electronic processors additional social media platforms to determine one or more related social media accounts corresponding to the entity of interest.

In another form, generating the linked social network data structure includes:
  for each of the related social media accounts determining links based on social media interactions between each of the related social media accounts of the entity of interest and further social media accounts on the social media platform or the additional social media platforms corresponding to other entities.

In another form, the linked network data structure and the risk profile of the entity of interest is updated over time.

In a second aspect, the present disclosure provides a computer-implemented risk profiling system for determining a risk profile of an entity of interest, comprising:
  an interrogation server comprising one or more processors configured to interrogate a social media platform to determine a social media account corresponding to the entity of interest;
  a collection server comprising one or more processors configured to generate a linked social network data structure linking the social media account corresponding to the entity of interest to one or more other social media accounts on the social media platform corresponding to other entities, wherein an individual link is based on one or more social media interactions between the social media account corresponding to the entity of interest and each of the one or more other social media accounts corresponding to other entities;
  a link analysis server comprising one or more processors configured to assign an individual link risk measure to one or more of the individual links of the linked network data structure, the individual link risk measure based on a risk assessment of the one or more social media interactions upon which the individual link is based on and to then determine the risk profile of the entity of interest based on an aggregated risk measure based on the linked social network data structure comprising the individual link risk measures.

In another form, interrogating the social media account by the interrogation server comprises: providing entity selection information characterising the entity of interest;
  interrogating the social media platform to identify one or more candidate social media accounts, each candidate social media account comprising candidate information;
  ranking the one or more candidate social media accounts based on a degree of similarity between the entity selection information and candidate information for each candidate social media account to provide a set of ranked candidate social media accounts; and
  selecting the social media account corresponding to the entity of interest from the set of ranked candidate social media accounts.

In another form, generating the linked social network data structure by the collection server comprises:
  collecting data items from the social media account;
  determining data items corresponding to social media activities;
  determining social media interactions for the social media account based on the social media activities that relate to an interaction between the entity of interest and another social media account corresponding to another entity;

In another form, determining data items corresponding to social media activities includes comparing a data item with a previous version of a data item to identify a change in the data item.

In another form, determining social media interactions includes determining whether the social media account of the entity of interest and another social media account corresponding to another entity have interacted with common content on the social media platform.

In another form, the risk assessment is based on a textual analysis of the one or more social media interactions.

In another form, the textual analysis includes a measure of a relevance of the social media interaction in combination with a measure of a sentiment of the one or more social media interactions.

In another form, the risk assessment is based on an image analysis of the one or more social media interactions.

In another form, an initial entity risk measure is determined by the link analysis server for each of the one or more other social media accounts linked to the social media account of the entity of interest.

In another form, the individual link risk measure for a link between the entity of interest and another entity is also based on the initial entity risk measure for the other entity.

In another form, the system includes interrogating by the collection server additional social media platforms to determine one or more related social media accounts corresponding to the entity of interest.

In another form, generating the linked social network data structure by the link analysis server includes:
  for each of the related social media accounts determining links based on social media interactions between each of the related social media accounts of the entity of interest and further social media accounts on the social media platform or the additional social media platforms corresponding to other entities.

In another form, the linked network data structure and the associated risk profile of the entity of interest is updated by the link analysis server over time.

In a third aspect, the present disclosure provides a risk profiling system for determining a risk profile of an entity of interest, comprising:

one or more processors;

memory in electronic communication with the one or more processors; and instructions stored in the memory and operable, when executed by the processor, to cause the system to:

interrogate a social media platform to determine a social media account corresponding to the entity of interest;

generate a linked social network data structure linking the social media account corresponding to the entity of interest to one or more other social media accounts on the social media platform corresponding to other entities, wherein an individual link is based on one or more social media interactions between the social media account corresponding to the entity of interest and each of the one or more other social media accounts corresponding to other entities;

assign an individual link risk measure to one or more of the individual links of the linked network data structure, the individual link risk measure based on a risk assessment of the one or more social media interactions upon which the individual link is based on; and determine the risk profile of the entity of interest based on an aggregated risk measure based on the linked social network data structure comprising the individual link risk measures.

BRIEF DESCRIPTION OF DRAWINGS

Embodiments of the present disclosure will be discussed with reference to the accompanying drawings wherein.

In the following description, like reference characters designate like or corresponding parts throughout the figures.

DETAILED DESCRIPTION

Figure 1:
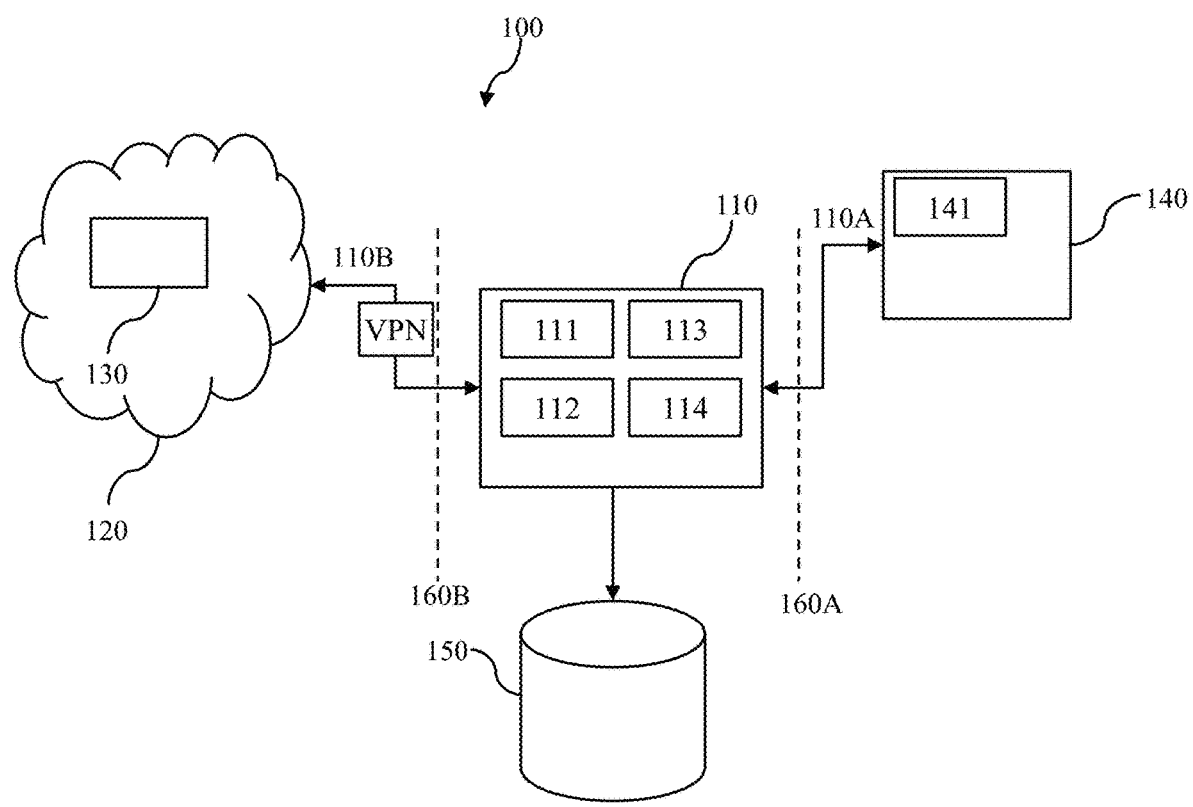
FIG. 1 is a system overview diagram of a risk profiling system for determining the risk profile of an entity of interest in accordance with an illustrative embodiment.

Referring now to FIG. 1, there is shown a system overview diagram of a risk profiling system 100 for determining the risk profile of an entity of interest based on their social media presence according to an illustrative embodiment. In this specification, the term "entity" is defined to include, but not be limited to, individuals, groups of individuals, organisations, businesses or any other commercial or legal structure.

In this specification, the term "social media platform" is defined to be an online software system comprising an online community where an entity can create a social media account and which includes online communication channels directed to community interaction, content sharing and collaboration allowing entities to interact with each other online.

Risk profiling system 100 includes a user interface 140 which is connected to a computer system 110 comprising an electronic processor and a database 150 for the storage of electronic information. Computer system 110 which may comprise one or more processors is connected to the Internet 120 by a network connection and is configured to interrogate social media platform 130 which operates in the Internet 120. In one illustrative embodiment, user interface 140 comprises a web browser 141 that connects to a complementary web portal interface served by computer system 110 over a secure HTTPS connection.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and the computer can be operated in a client-server configuration to permit a user to retrieve web pages from a web-based server. Furthermore, any of various conventional web browsers can be used to display and manipulate data on web pages.

Figure 2:
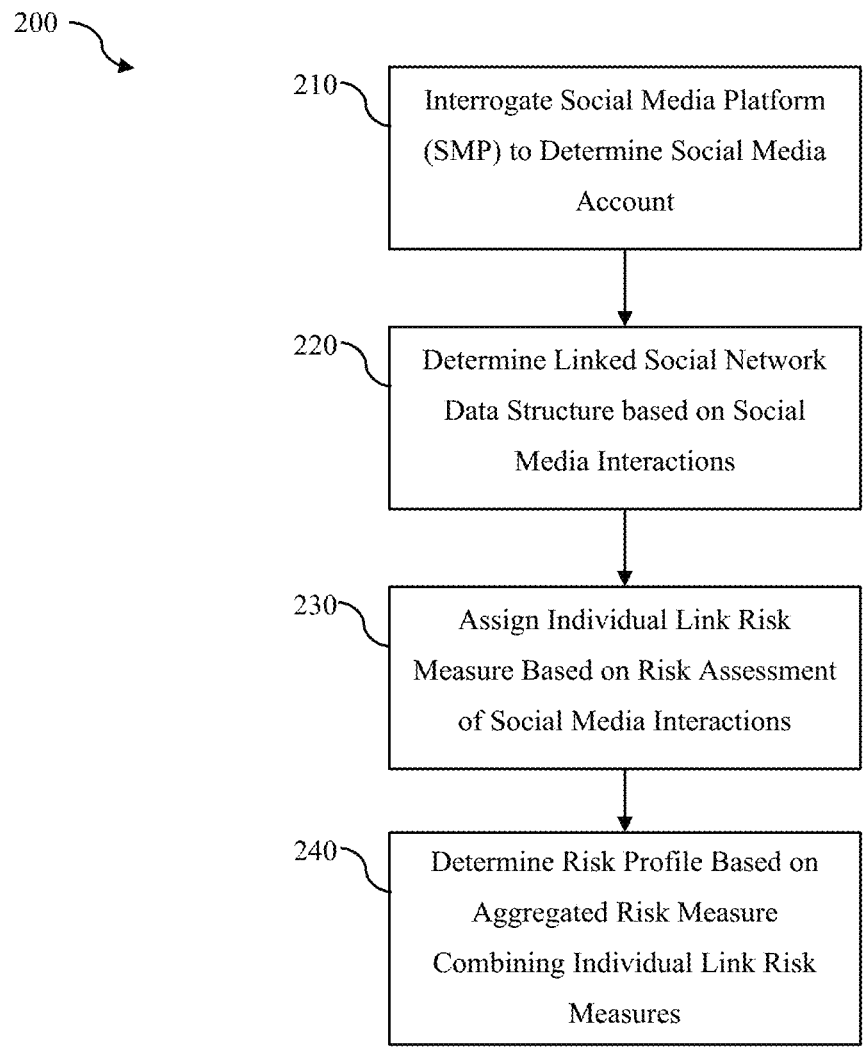
FIG. 2 is a flowchart of a method for determining a risk profile of an entity of interest in accordance with an illustrative embodiment that may be implemented on the risk profiling system illustrated in FIG. 1.

Referring now to FIG. 2, there is shown a flowchart of a method 200 for determining a risk profile of an entity of interest based on their social media presence according to an illustrative embodiment. In one example, method 200 may be implemented on the risk profiling system 100 illustrated in FIG. 1 or the risk profiling system 1000 illustrated in FIG. 18.

At step 210, for a given entity of interest such as a person, the online social media platform is interrogated to determine a social media account that corresponds to the entity of interest. In one example, an interrogation server 111 (eg, see FIG. 1) is configured to operate on computer system 110 and the entity of interest is entered by way of user interface 140 consisting of a web browser 141 that connects to the interrogation server by way of a HTTPS connection 110A.

In one example, the entity of interest is defined by a known entity identifier such as an associated URL, username or handle for the social media platform and the social media account of the entity of interest may be determined on this basis.

Figure 3:
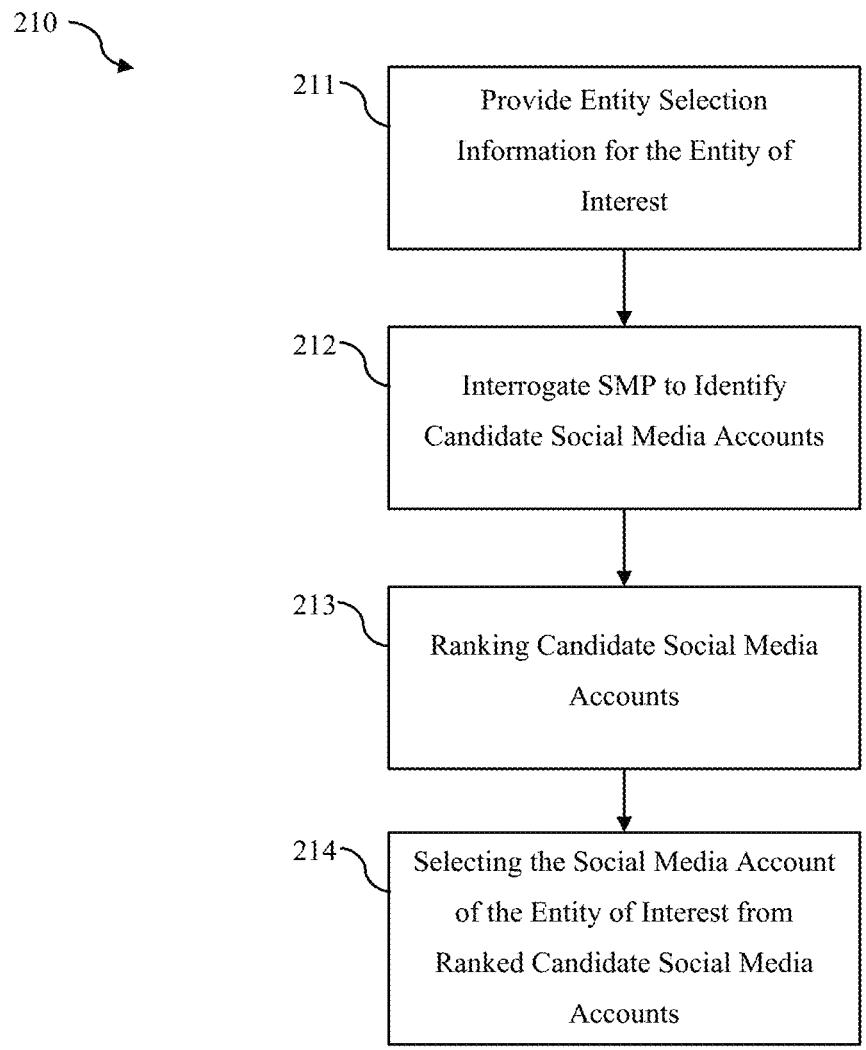
FIG. 3 is a flowchart of a method for determining the social media account of the entity of interest in accordance with an illustrative embodiment.

More typically, the social media account for the entity of interest must be determined. Referring now to FIG. 3, there is shown a flowchart of a method 210 of determining the social media account of the entity of interest according to an illustrative embodiment At step 211, entity selection information characterising the entity of interest is provided to risk profiling system 100, the entity selection information including, but not limited to: email address, mobile phone number, age, date of birth, entity image, real world name (eg, first name, surname), alias, location (eg, city, state, country), company, industry, social media association (eg, liked groups, employers), real world associations (eg, wife, friend), or any combination of the above.

At step 212, the social media platform is then interrogated by carrying out a search to identify candidate social media accounts based on the entity selection information. Depending on the social media platform, the following candidate information may be retrieved from a candidate social media account including, but not limited to:

account holder identity and profile information including, but not limited to: account identifiers, usernames, person names and aliases, date of birth, gender, education and employment details, languages spoken, or length of membership/age of account;

account holder contact information including, but not limited to: telephone numbers or email addresses;

account holder associate information including, but not limited to: family, friends, followers & people followed, forum memberships, relationship status;

account holder location information including, but not limited to: full or partial address, place of birth, school location or other location details; or account holder visual information including, but not limited to, profile photos, photo & video albums.

At step 213, the candidate social media accounts are then ranked by interrogation server 111. In one example, a similarity measure is determined for each candidate account depending on the degree of similarity between the entity selection information and the candidate information which may also be expressed as a confidence level that the candidate social media account is a match to the social media account of the entity of interest.

In one example, the degree of similarity is determined based on the type of candidate information such as set out below:

For account holder contact type information the degree of similarity between the entity selection information and the candidate information may be determined by exact string matching or "edit" distance.

For account holder identity and profile type information the degree of similarity between the entity selection information and the candidate information may be determined by "edit" distance on person names and aliases, "edit" distance on date of birth and binary match on gender.

For account holder associate type information the degree of similarity between the entity selection information and the candidate information may be determined by edit distance comparing family, friends and followers.

For account holder location type information the degree of similarity between the entity selection information and the candidate information may be determined by geographical distance.

For account holder visual type information the degree of similarity between the entity selection information and the candidate information may be determined by facial recognition distance match.

In this example, the degree of similarity or confidence level is determined based on a normalised, weighted sum of the individual degrees of similarity for each of the information types referred to above.

In another example, the degree of similarity may be determined by a learnt classification model operating over the above information types. A variety of classification models may be used. In one example, a classification model is trained on features derived from the above information types, where the features are represented as vectors in a multi-dimensional feature vector space. The classification model is then trained to place similar social media accounts closer to each other in the feature vector space and dissimilar social media accounts further apart in the feature vector space. The trained classification model is then applied to the candidate social media accounts to obtain a ranked list of candidate social media accounts based on the proximity to the input entity selection information.

At step 214, the social media account corresponding to the entity of interest is selected from the set or list of ranked candidate social media accounts. In one example, the top ranked candidate social media account is automatically determined to be the social media account of the entity of interest. In another example, the highest ranked candidate social media accounts are presented to an operator for selection of the social media account corresponding to the entity of interest. In yet another example, a selection of social media accounts that are ranked above a predetermined threshold would be nominated as individual entities of interest to which the following risk assessment process would be applied for each case.

In this example, the user interface 140 via web browser 141 also provides the capability to:

configure and manage collection of data;

configure risk analytics;

search, review and visualise the collected data and analytic output; and export data to external tools for further analysis.

In one example, interrogation server 111 includes a firewall. As would be appreciated, this configuration allows for remote access to the risk profiling system 100. In this illustrative embodiment, interrogation server 111 communicates with social media platform by network connection 110B which may include an optional firewall 160B and/or virtual private network (VPN) server in order to obfuscate the IP address of the interrogation server 111.

In one example embodiment, risk profiling system 100 includes a HTTPS proxy server 112 (eg, see FIG. 1) configured to operate on data processor 110 which allows an operator to browse the Internet via a browser plugin in web browser 141 using the same VPN connection as the interrogation server 111. This facility provides IP obfuscation for any web browsing by the operator configuring risk profiling system 100.

Referring back to FIG. 2, at step 220, a linked social network data structure is determined that links the social media account of the entity of interest to one or more other social media accounts on the social media platform where the link is based on a social media interaction between the entity of interest's social media account and the other social media accounts.

Figure 4:
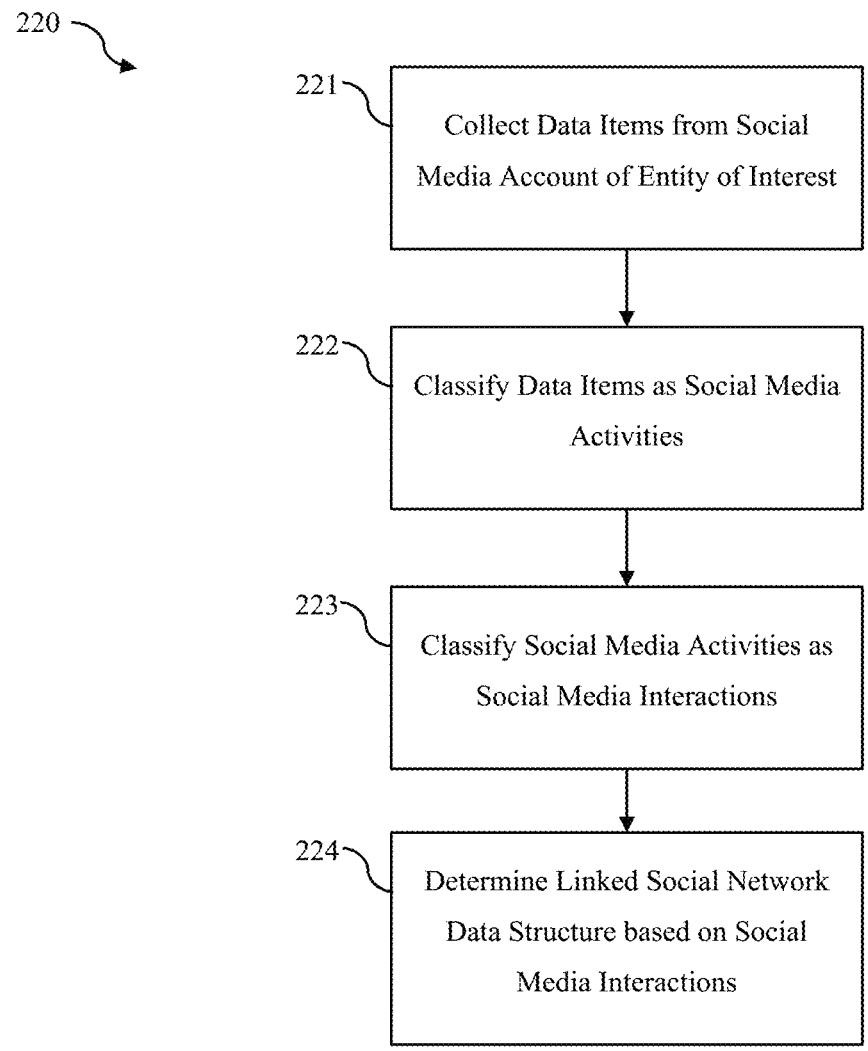
FIG. 4 is a flowchart of a method for determining a linked social network data structure in accordance with an illustrative embodiment.

Referring now to FIG. 4, there is shown a flowchart of one example method 220 for determining a linked social network data structure. At step 221, in this illustrative embodiment, once the social media account corresponding to an entity of interest has been determined, a collection server 113 (eg, see FIG. 1) configured to operate on computer system 110 functions to collect data items from the social media account of the entity of interest to populate an entity data structure 300 corresponding to the entity of interest for storage in database 150.

Figure 5:
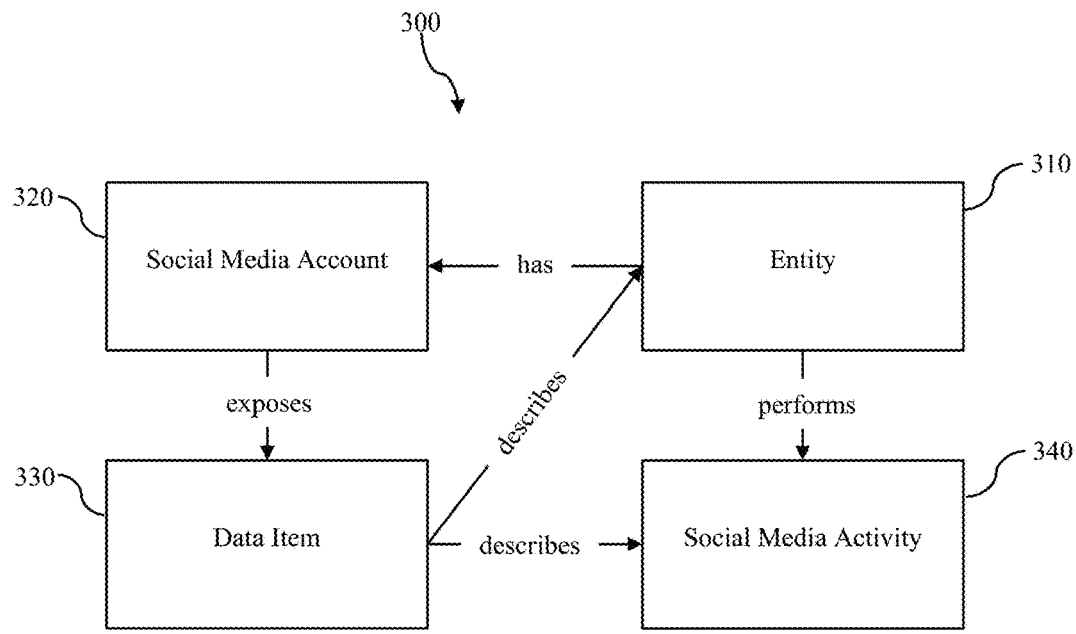
FIG. 5 is a depiction of the entity data structure that characterises an entity having a social media account in accordance with an illustrative embodiment.

Referring now to FIG. 5, there is shown an entity data structure 300 according to an illustrative embodiment which characterises an entity 310 having a social media account 320. The social media account 320 includes one or more data items 330 which may include entity details that describe the entity 310 and further include configuration details pertaining to the social media platform. Data items 330 may also include multimedia data such as text, images, videos and audio and derived data items that are unique to the social media platform such as social media account metadata comprising profile information including, but not limited to: gender, age, nationality, place of residence, place of birth, education, marital status and religion.

At step 222, collection server 113 classifies data items 330 as social media activities 340 that are performed by the entity 310 on the social media platform including, but not limited to, social media activities such as posts, reposts, shares, comments, replies, joining groups, adding and removing friends/followers or reactions (eg, likes).

In one example, the classification of a data item 330 as a social media activity 340 may occur as a result of comparing a data item with a previous version of a data item in order to identify changes. In one illustrative example, a comparison of a data item 330 listing the friends or connections of an entity on a social media account may be compared to an earlier version to generate one or more "Added a Friend/Connection/Follower" social media activities for that data item 330 depending on the number of friends or connections added since the previous collection.

In another example, a visual change in an entity's profile picture may be classed as a social media activity. In a further example, a change in membership in respect of an online community such as a group, organisation or like may be classed as a social media activity. In yet another example, a change in the volume of content or interactions over a predetermined time such as a significant increase/decrease or halt in activity may be classed as a social media activity.

In another example, an actual activity such as an entity changing location (eg, going on holiday) will be classed as a social media activity.

At step 223, collection server 113 identifies and classifies social media activities determined in the previous step as social media interactions. In this illustrative embodiment, a social media interaction is a social media activity 340 associated with an entity 310 which concerns an interaction between the entity of interest and another social media account that corresponds to another entity.

Examples of social media interactions include, but are not limited to:
   the entity of interest connecting to another social media account corresponding to another entity (eg, becoming a follower or friend or joining a group, forum or online community);
   the entity of interest disconnecting from another social media account corresponding to another entity (eg, ceasing to be a follower or friend or leaving a group, forum or online community);
   the entity of interest reacting to another social media account corresponding to another entity (eg, liking, disliking or otherwise reacting);
   the entity of interest interacting with content from another social media account such as by commenting on, replying to, reacting to, quoting, reposting or sharing the initial content from their social media account; or
   the entity of interest mentioning, tagging or referring to another entity or the social media account corresponding to another entity.

In one example, the entity of interest may be commenting or otherwise interacting with social media content such as a post from a group or forum page or an otherwise unrelated entity on the social media platform and another entity also interacts with the same social media content by, for example, also commenting on the same post. This social media activity is then also classified as a social media interaction between the entity of interest and the other entity on the basis that they have both interacted with common content on the social media platform.

At step 224, the collection server 113 generates the linked social network data structure centred about the entity of interest and comprising links to each of the other social media accounts corresponding to other entities where a link requires there to be at least one social media interaction between the social media account of the entity of interest and the linked social media account of the other entity.

Figure 6:
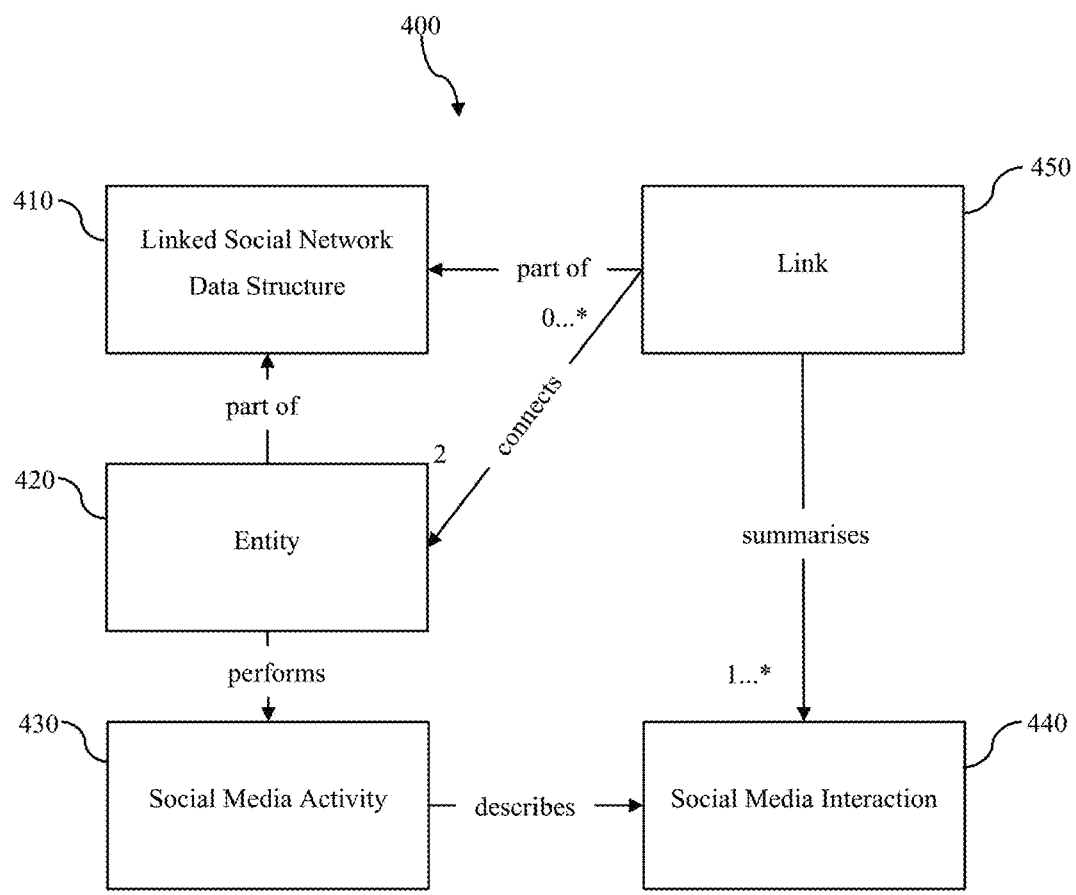
FIG. 6 is domain model of a linked network data structure in accordance with an illustrative embodiment.

Referring now to FIG. 6, there is shown a domain model 400 of a linked social network data structure 410 according to an illustrative embodiment. Linked social network data structure 410 consists of one or more entities 420 including the entity of interest and other entities that are connected to the entity of interest by links 450 which comprise the linked social network structure 410. The links 450 that connect the entities are based on the social media interactions 440 which are a subset of the social media activities 430 performed by the entity of interest that involve at least one other entity. In this manner, the link connecting entities is comprised of, or characterises, all the social media interactions 440 between those two entities.

In one example, the process of generating the linked social network structure 410 will also involve automatically populating respective entity data structures 300 for the other entities that are linked to the entity of interest. In this manner, selection of an entity of interest will then automatically generate a linked social network data structure comprising other entities as well as their associated populated entity data structures which in turn may characterise links between these other entities.

Referring back to FIG. 2, at step 230 an individual link risk measure is assigned to links of the linked network data structure where the individual link risk measure is based on a risk assessment of the one or more social media interactions upon which the link is based on. In one embodiment, a link analysis server 114 configured to operate on computer system 110 carries out this process (eg, see FIG. 1).

In one example, the risk assessment comprises a textual analysis of any text forming part of the data item that forms the basis for the social media interaction. This can also include text extracted from images by optical character recognition techniques. In one embodiment, the textual analysis includes matching words or phrases to a predetermined list of words/phrases that are of interest. In one example, the predetermined lists of words/phrases may be divided into different categories of interest for the risk profiling activity.

Figure 7:
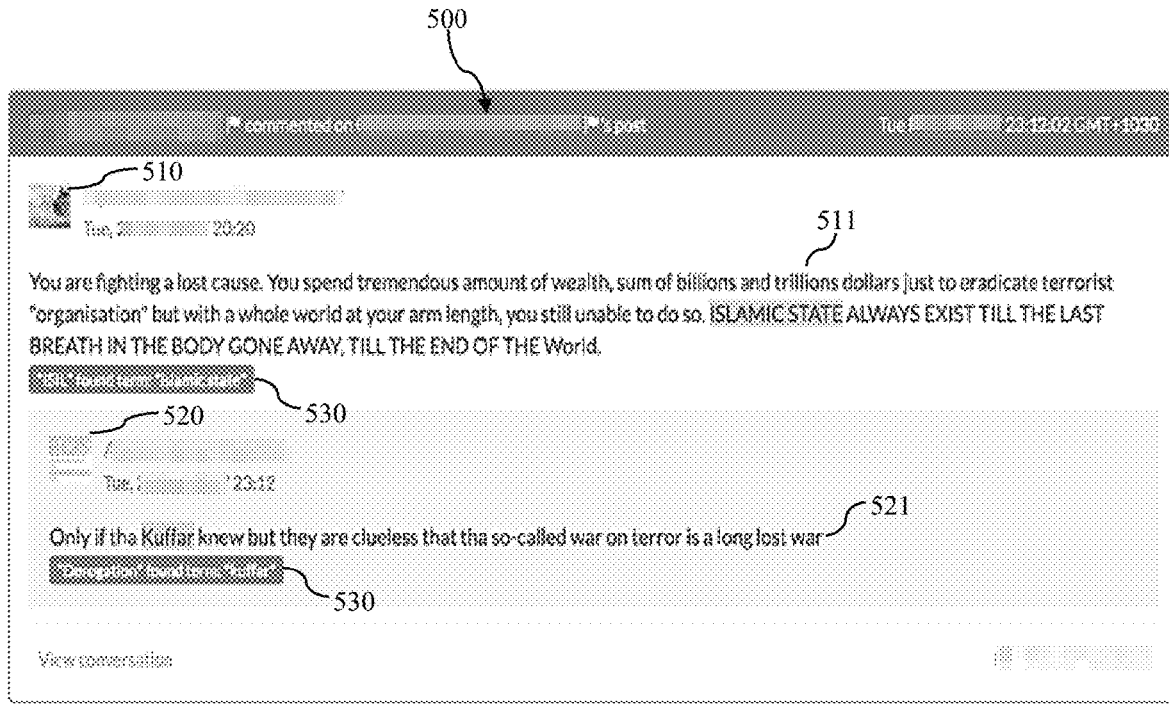
FIG. 7 is a depiction of a social media interaction comprising a post and follow up comment showing the use of textual matching to determine a risk measure in accordance with an illustrative embodiment.

Referring now to FIG. 7, there is shown a social media interaction 500 comprising a comment 521 made by a related entity 520 to a post 511 on a social media post made by the entity of interest 510. In this example, the term "ISLAMIC STATE" has been identified by textual matching 530 and further the term "KUFFAR" was identified in the comment made by the related entity. Textual matching may be divided into a number of categories and in this example, the term "ISLAMIC STATE" has been categorised in the "islamic state" category and the term "kuffar" has been categorised in the "Derogation" category.

Figure 8:
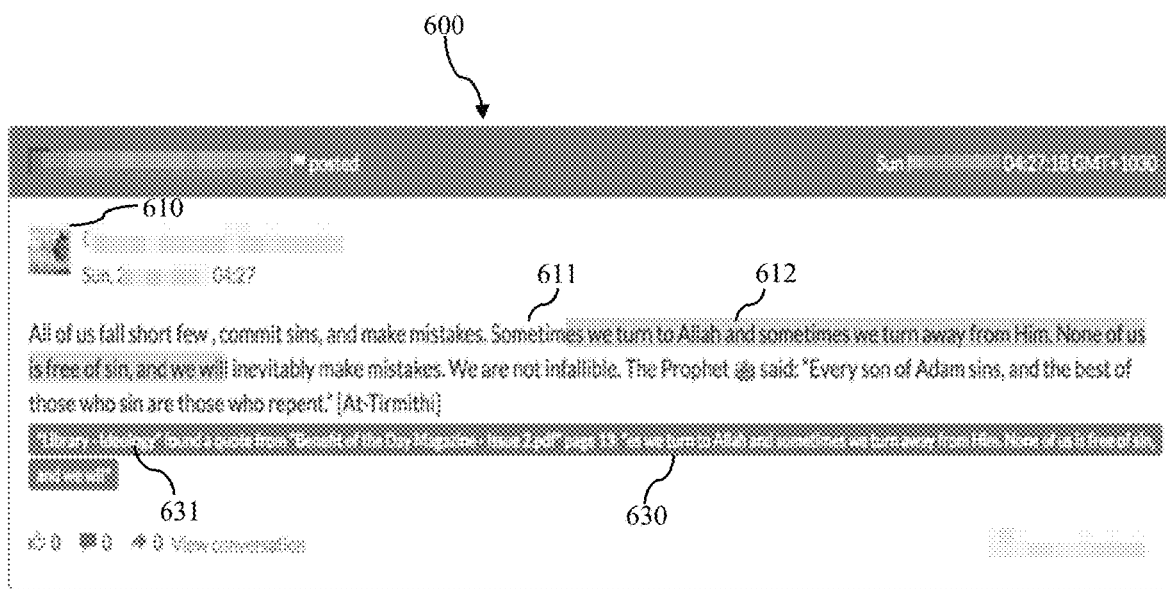
FIG. 8 is a depiction of a social media activity comprising a post showing the use of textual matching to determine a risk measure in accordance with another illustrative embodiment.

Referring now to FIG. 8, there is shown a social media activity 600 comprising a post 611 made by an entity 610 on a social media platform. In this example, the indicated quote 612 was identified by textual matching 630 to a list of texts categorised into different libraries. In this example, the indicated quote 612 was categorised as belonging to a publication or text in the library "Library-Ideology" 631.

In one embodiment, the textual analysis includes determining a risk measure for a given social media interaction in the form of a binary score associated with the presence or absence of words from a predetermined list of words or phrases such as quotes from relevant texts.

In another embodiment, the textual analysis includes determining a risk measure for a given social media interaction in the form of a continuous score between zero and one that measures the relevance of this interaction to a category of interaction subject topics (eg, "drugs", "alcohol" or "ideology"). In this example, a given category is first characterised by a set of predetermined words/phrases relevant to that category. Each of these words/phrases is then represented in a high dimensional vector space constructed so that contextually and semantically similar words are located near to each other. The textual content of the social media interaction is then projected into this high dimensional vector space and the risk measure is then determined by calculating a distance measure in this high dimensional vector space normalised between zero and one.

In another embodiment, the textual analysis includes determining a combination risk measure for a given social media interaction in the form of a continuous score between zero and one that measures the relevance of the social media interaction to a category of interaction subject topics (eg, "drugs", "alcohol" or "ideology") combined with a continuous score between zero and one that measures a specific sentiment for the social media interaction (eg, "happy", "fearful", "angry"). In one example, a sentiment classifier is trained using a training corpus comprising a set of social media posts with their associated reactions (eg, like, love, hate etc.). These reactions are then used as a substitute for human labels defining positive, negative or neutral sentiment for a given social media posts. The words and phrases in those posts and the associated reactions are then used to train the sentiment classifier to recognise the sentiment of input text arising from the social media interaction.

In another embodiment, the risk assessment comprises an image analysis of any images forming part of the data item that forms the basis for the social media interaction to determine whether the images contain objects from a predetermined list of objects of interest. In another example, the image analysis determines whether the images contain logos from a predetermined list of logos of interest. In another example, the image analysis determines whether the images contain faces from a predetermined list of faces of interest.

Figure 9:
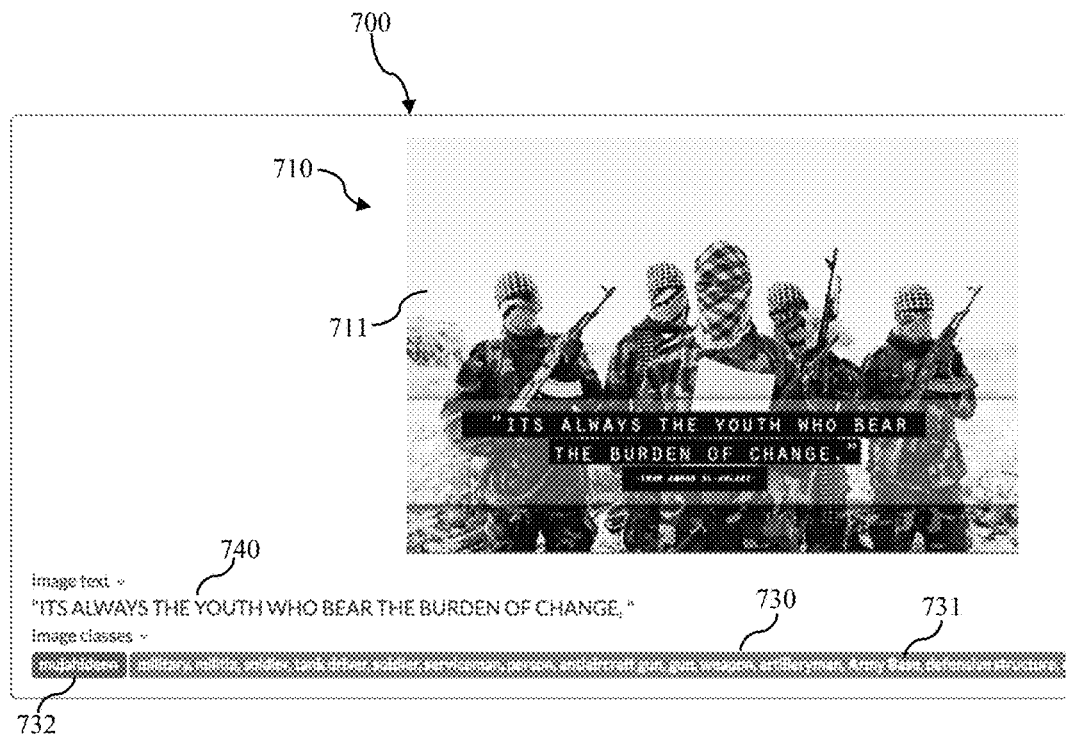
FIG. 9 is a depiction of a social media activity comprising a post of an image showing the use of an image classifier and text extractor to determine a risk measure in accordance with an illustrative embodiment.

Referring now to FIG. 9, there is shown a social media activity 700 comprising a post 710 made by an entity on a social media platform comprising an image 711 which has been classified by an image classifier 730 to determine whether it contains any objects of interest. As can be seen, the image classifier 730 has determined that the image contains a number of objects of interest 731 in this case in the category "mujahideen" 732. In this example, image classifier 730 has also extracted text 740 present in the image.

In this manner, each social media interaction may be assigned a risk measure following risk assessment of the social media interaction and then any link between two entities based on one or more social media interactions may be assigned an individual link risk measure based on the determined risk measures for the one or more social media interactions that form the basis for the link between the entity of interest and the other entity.

In one example, the individual link risk measure may comprise a number of sub-measures pertaining to different risk assessment categories such as a sub-measure directed in one example to "ideology" and a sub-measure direct to "weapons" which may be reviewed separately. In another example, the sub-measure is determined for each social media interaction across all risk assessment categories to allow identification of high risk social media interactions that could occur.

In another example, the individual link risk measure may include a risk measure based on the number of social media interactions between entities that occur for a predetermined time period or any changes in this number over successive time periods.

In another example, the individual link risk measure may include a weighted sum where the weight is attributed to the type of social media interaction from the perspective of the entity of interest based on a degree of interaction measure of the social media interaction. In one example, for given content that has a high risk measure as determined by risk assessment, the degree of interaction measure would be higher if the entity of interest posted the content as opposed to commenting on the content. Correspondingly, the degree of interaction measure would be higher for commenting on the content compared to the case of the entity of interest reposting the content without comment which in turn would have a higher degree of interaction measure as compared to the situation of where the entity of interest just "liked" the content.

In another illustrative embodiment, each social media activity for each entity in the linked social network data structure is assigned an activity risk measure based on the data item forming the basis for the social media activity. In this example, each entity may be assigned an initial entity risk measure based on the social media activities they enter into on the social media platform without regard to whether those social media activities are related to an interrelationship between two or more entities.

This initial entity risk measure may then be used to weight the individual link risk measure. As an example, the individual link risk measure for a link between the entity of interest and another entity based on their social media interactions where the other entity has initial entity risk measure that is high based on an assessment of their general social media activities on the social media platform would be weighted higher than the same individual link risk measure where the other party has a low initial entity risk measure.

In another example, an initial entity risk measure may be assigned to or prescribed for an entity, as a result enhancing the individual link risk measure for any entity of interest that has a social media interaction with this entity.

Figure 10:
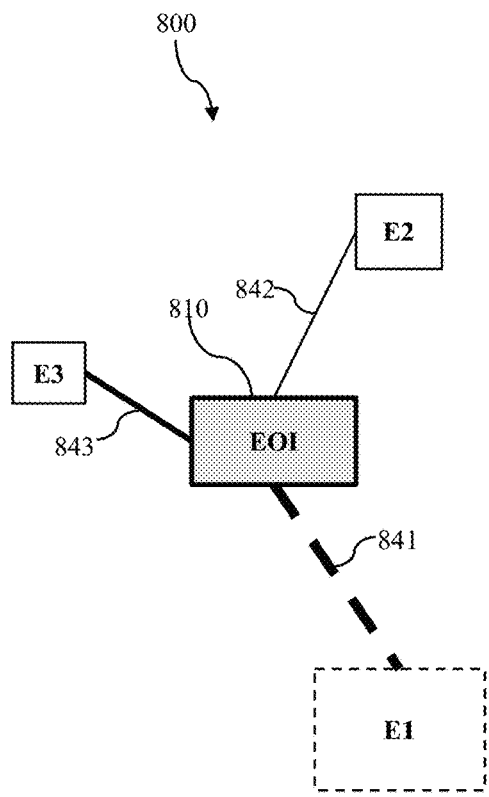
FIG. 10 is a visual depiction of a linked network data structure showing the links between the entity of interest and other entities in accordance with an illustrative embodiment.

Referring now to FIG. 10, there is shown a visual depiction of a linked network data structure 800 according to an illustrative embodiment. In this example, the entity of interest (EOI) 810 is linked to the other entities (E1, E2 and E3) where an individual link is based on one or more social media interactions as has been previously described. By way of example, EOI 810 is linked to other entities E1, E2, and E3, by respective links 841, 842 and 843.

In this example, the number of social media interactions between an entity and another entity is shown by the weight or thickness of the line with a thicker line representing more social media interactions between the linked entities. Where the individual link risk measure for a link connecting entities exceeds a risk threshold then the line in this example is dashed.

Where an initial entity risk measure is determined, in the example visual depiction of FIG. 10, the size of the box indicating an entity in the linked network data structure 800 will reflect this initial entity risk measure which may be used to weight the individual link risk measure as described above. In the example visual depiction of FIG. 10, were the initial entity risk measure exceeds a threshold then the box outline is dashed.

As would be appreciated, the visual depiction illustrated in FIG. 10 is but one example. In another example, colour coding may also be used to indicate where various risk measure thresholds have been exceeded. As would also be appreciated, the linked network data structure 800 of FIG. 10 is highly simplified to illustrate the principles of the present disclosure and in a real use case there may be large number of links to other social media accounts corresponding to other entities.

As would be appreciated, visual depictions of the linked network data structure in accordance with the example illustrated in FIG. 8 allow an operator to extremely rapidly determine the level of risky engagement between an entity of interest and other entities in the social media network of the entity of interest.

Figure 11:
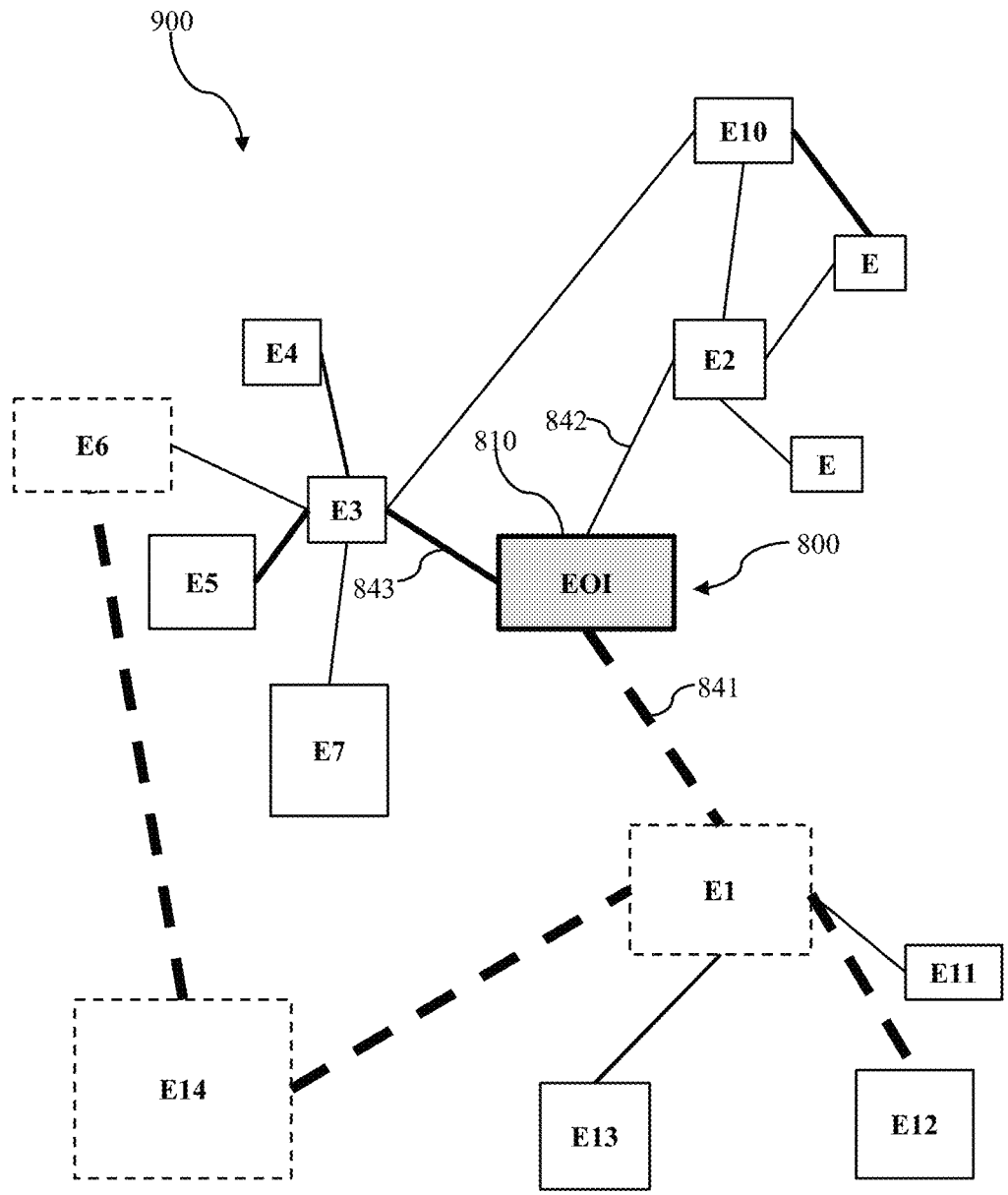
FIG. 11 is a visual depiction of an enhanced linked network data structure comprising the linked network structure illustrated in FIG. 10 expanded to the next level of links in accordance with an illustrative embodiment.

Referring now to FIG. 11, there is shown a visual depiction of an enhanced linked network data structure 900 comprising the linked network structure (Level 1), ie E1, E2 and E3, illustrated in FIG. 10 expanded to the next level of links (Level 2), ie E4, E5, E6, E7, E8, E9, E10, E11, E12, E13 and E14, according to an illustrative embodiment. In this example, for each of the entities that are linked to the entity of interest a further level of links is determined to generate enhanced linked network data structure 900 by determining social media interactions between the entity at the first level and entities at the second level and then assigning individual link risk measures to each of these links based on risk assessment of the respective social media interactions.

In one example, the links between Level 1 and Level 2 may be used to determine the initial entity risk measure for those entities on Level 1 which will further feed in to determining the individual link measures between the Level 1 entities and the entity of interest. In this way, entities that are more than one level removed from the entity of interest may be utilised in determining the risk profile of the entity of interest. As would be appreciated, the process may be repeated again to generate the next level of linked entities (ie, Level 3) and so on.

In the example shown in FIG. 11, once the Level 2 entities have been identified then links between these Level 2 entities and other Level 2 or Level 1 entities are determined. The resulting topology of the linked network data structure 900 as a result provides insight into how disparate entities may be indirectly linked together.

In another embodiment, it is possible to filter the linked network data structure based on the type of social media interaction. In one example, the filtered linked network data structure is based on a social media interaction where one entity has followed another entity. In another example, the filtered linked network data structure is based on a social media interaction where one entity has reacted to a social media post or activity by another entity. In yet another example, the filtered linked network data structure is based on a social media interaction where one entity has commented on a social media post or activity of another entity. As would be appreciated, this ability to filter the linked network data structure in accordance with the type of social media interaction provides additional insight into the type of linkages between the entities in the structure.

Referring again to FIG. 2, at step 240 the risk profile for the entity of interest is determined based on an aggregated risk measure combining the individual link risk measures determined between the entity of interest and the linked entities based on the linked social network data structure now comprising the individual link risk measures. In one example, the risk profile may be based on risk measures aggregated over different risk assessment categories or topics such as "ideology" and "weapons" as has been previously described so that these may be separately examined. In one example embodiment, the link analysis server 114, configured to operate on computer system 110, functions to determine the risk profile.

Figure 14:
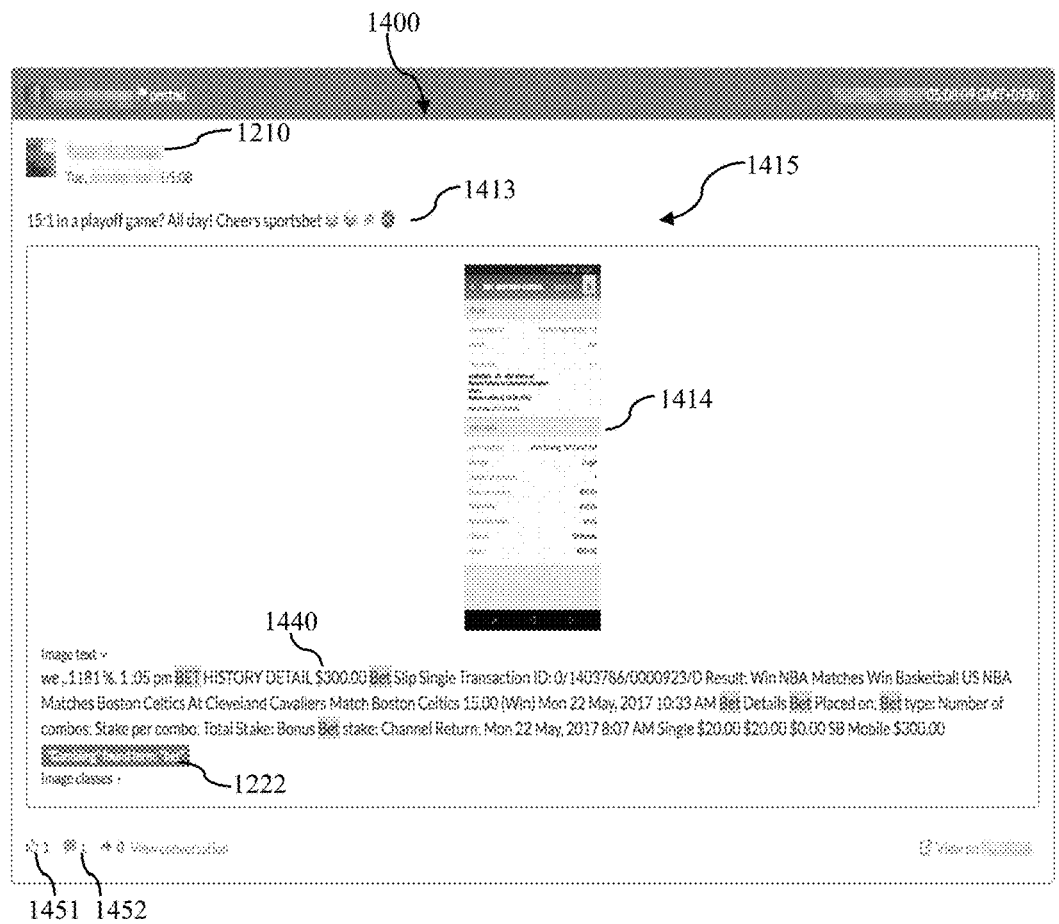
FIG. 14 is a depiction of a social media interaction comprising a post of an image and follow up comment and reaction showing the use of text extraction from an image to determine a risk measure in accordance with an illustrative embodiment.
Figure 15:
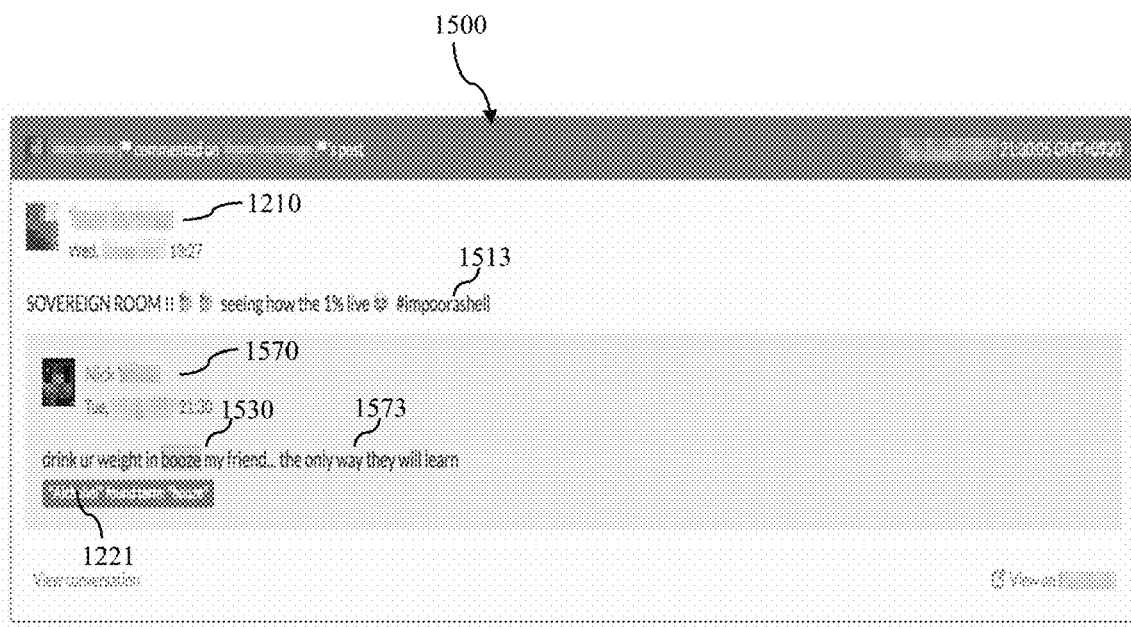
FIG. 15 is a depiction of a social media interaction comprising a post and follow up comment showing the use of textual matching to determine a risk measure in accordance with an illustrative embodiment.
Figure 16:
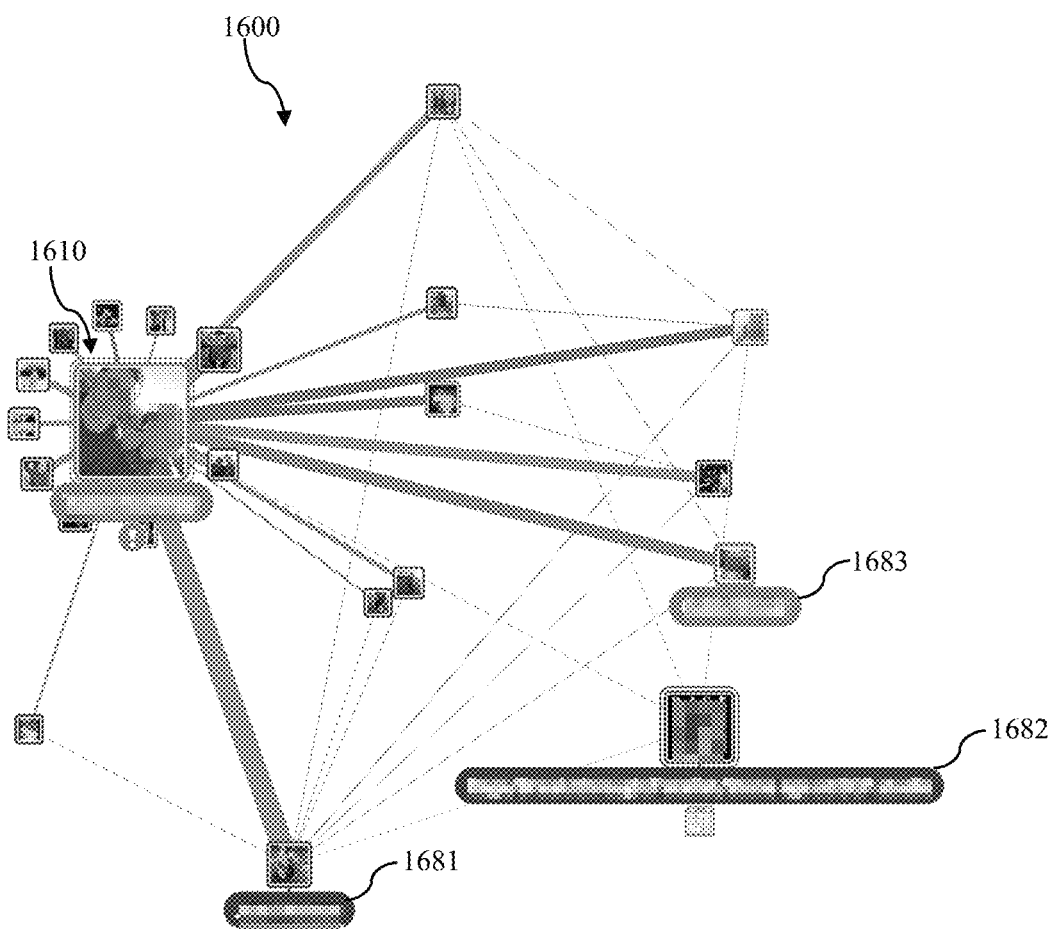
FIG. 16 is a visual depiction of a linked network data structure showing the links between the entity of interest and other entities based on the social media activities and interactions illustrated in FIGS. 12 to 15 in accordance with another illustrative embodiment.

Referring now to FIGS. 12 to 15, there are shown depictions of a number of social media activities and interactions and an associated linked network data structure 1600 illustrated in FIG. 16 relating to determining a risk profile based on antisocial behaviour such as alcohol consumption and gambling.

Figure 12:
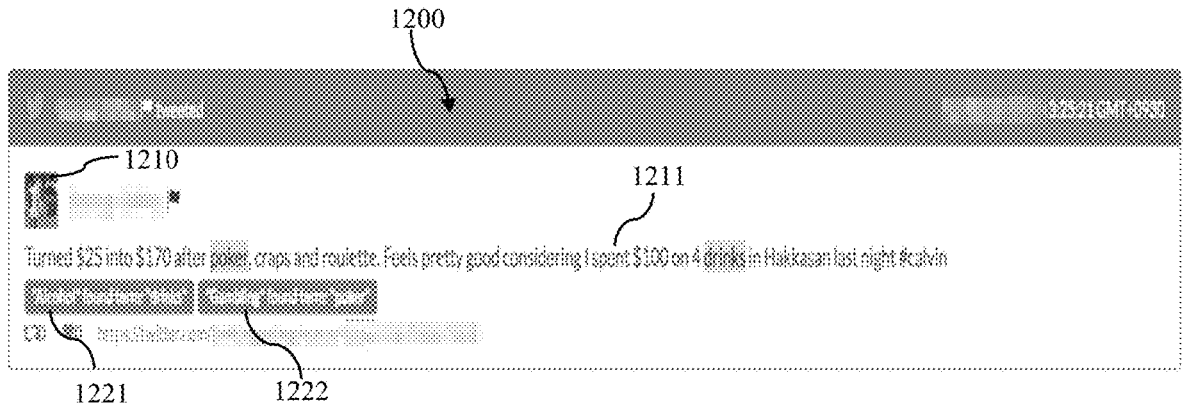
FIG. 12 is a depiction of a social media activity comprising a post showing the use of textual matching to determine a risk measure in accordance with another illustrative embodiment.
Figure 13:
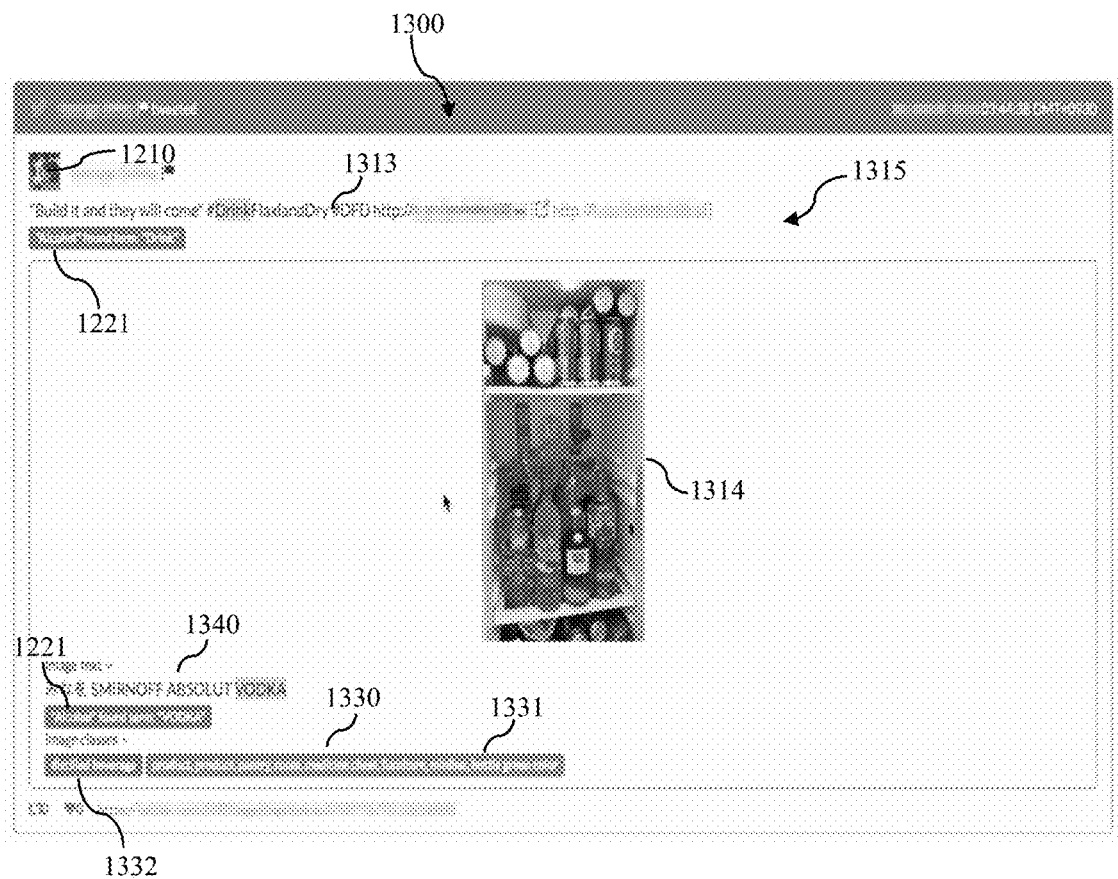
FIG. 13 is a depiction of a social media activity comprising a post of an image showing the use of an image classifier and text extractor to determine a risk measure in accordance with an illustrative embodiment.

Referring now to FIG. 12, there is shown a social media activity 1200 comprising a post 1211 by an entity of interest 1210. In this example, the terms "poker" and "drinks" have been identified in the "Alcohol" 1221 and "Gambling" 1222 categories which are of interest in this risk assessment exercise. Referring now to FIG. 13, there is shown a social media activity 1300 by the entity of interest 1210 comprising a post 1315 including text 1313 and an image 1314. In the text, the term "drink" has been identified in the "Alcohol" category 1221. As can be seen by inspection, image 1314 is a picture of fridge full of alcohol. Image classifier 1330 has determined a number of relevant objects 1331 in the category "distilled beverage" 1332. In this example, image classifier has also extracted text 1340 from the image which is an alcohol brand which has been identified in the "Alcohol" category 1221.

Referring now to FIG. 14, there is shown a social media interaction 1400 comprising a reaction 1451 in the form of "like" and a comment 1452 (not shown) in relation to a social media activity comprising a post 1415 by an entity of interest 1210 including text 1413 and an image 1414. As can be seen in this example, textual matching did not identify relevant material in the text 1413 of the post 1415 and the image classifier did not identify any objects in the image 1414 which is a betting transaction record, however, the image classifier extracted the text 1440 from image 1414 and the term "bet" has been identified in the "Gambling" category 1222.

Referring now to FIG. 15, there is shown a social media interaction 1500 comprising a comment 1573 made by a related entity 1570 to a post 1513 on a social media post made by the entity of interest 1210. In this example, the term "booze" has been identified by textual matching 1530 and has been further identified or classified in the "Alcohol" category 1221.

Referring now to FIG. 16, there is shown a visual depiction of a linked network data structure 1600 based on social media activities and interactions of the type illustrated in FIGS. 12 to 15 comprising in this example two levels similar to FIG. 11. In this example, each of the entities including the entity of interest 1610 is represented by a profile picture or image related to the entity. Similar to the linked network data structure illustrated in FIGS. 10 and 11, each of the individual links is based on one more social medial interactions.

In this example, the thickness of the link indicates that number of social media interactions between the linked entities and the darkness of the link corresponds to the individual link risk measure for the link connecting the entities. In those examples, where the assessed risk of an entity exceeds a threshold based on their social media activities the entities name is highlighted explicitly as shown for entities 1681, 1682, 1683. In this illustrative example, entity 1682 relates to a venue that provides alcohol and gambling services.

Figure 17:
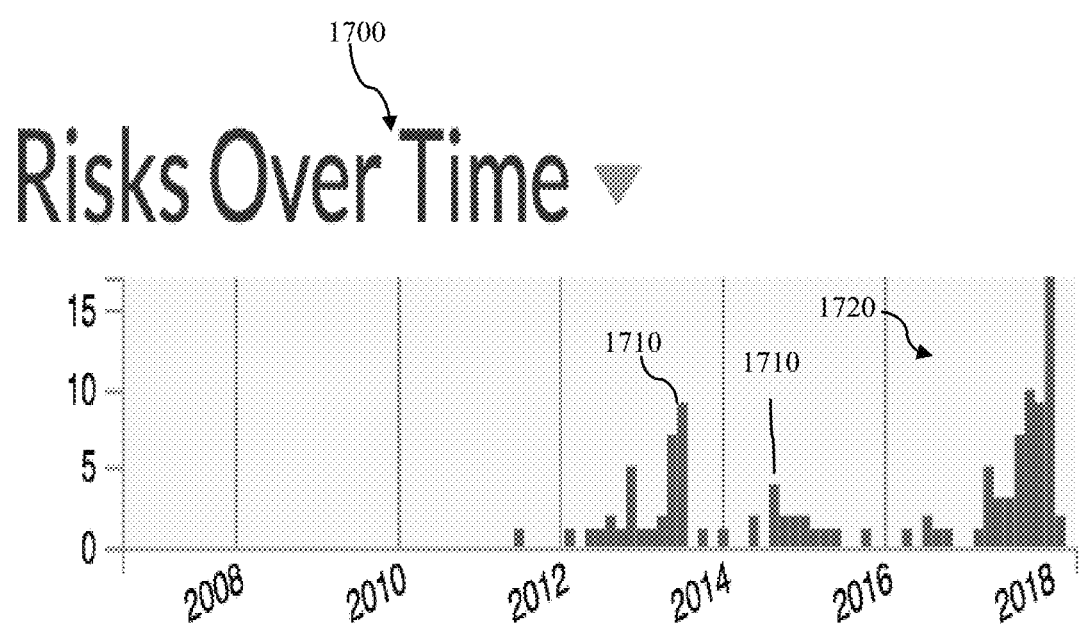
FIG. 17 is a graph of the variation of the risk profile of an entity of interest over time in accordance with an illustrative embodiment.

In another embodiment, the linked network data structure is updated on a periodic basis resulting in the associated risk profile of the entity of interest being updated over time. Referring now to FIG. 17, there is shown a graph 1700 of the variation of the risk profile or score 1710 of an entity of interest over time according to an illustrative embodiment. As would be appreciated, this allows the risk trajectory 1720 of an entity of interest to be tracked and inspected to determine whether there has been a change in behaviour that could trigger follow up or reclassification of the entity of interest.

In one example, where the risk profile includes separate risk assessment categories the updated risk profile may be used to determine changes in behaviour at a category or topic level and further define combined measures which detect changes in more than one selected categories.

Taking the example above with categories "ideology" and "weapons" the following may be determined:
  the risk score per category at any given time (eg, in September the score for "ideology" was 0.9 (high) or 0.1 (low));
  changes and rates of change in risk score for a given risk category (eg, from July to September the "ideology" score moved from 0.1 (low) to 0.9 (high)); and
  sequences of elevated risks (eg the entity of interest had a high score for the "ideology" category in September, followed by an increasing and elevated risk score in the "weapons" category from October to December which may indicate a pattern of concerning behaviour.

In another embodiment, a risk profiling system in accordance with the present disclosure may be expanded to operate over additional social media platforms. As with determining the social media account on the primary social media platform, entity selection information may be used to identify and match to candidate social media accounts on the additional social media platforms. Where a social media account has been identified for the entity of interest on the primary social media platform, then information from the already identified social media account may be used preferentially as entity selection information to identify and match to candidate social media accounts on the additional social media platforms.

In one example, a matching candidate social media account on a further social media platform may be assessed by measuring the similarity between the account metadata of the entity of interest on the first social media platform with that of the candidate social media account on the further social media platform. In another example, the assessment may be based on the degree of similarity of the account content between the two social media accounts on the different social media platforms. In another example, the assessment may be based on a degree of similarity of the social networks between the two social media accounts on the different social media accounts. In another example, the assessment may be based on a similarity measure comprising multiple weighted sub-measures of similarity.

Once the additional social media accounts corresponding to the entity of interest have been identified then social media activities may be determined and the social media interactions between the entity of interest and other entities on the additional social media platforms may be classified and form the basis of links between the entity of interest and the other entities. In some instances, the social media interaction will involve two different social media platforms, eg, an article posted on a first social media platform by the entity of interest could be shared by another entity on a second social media platform where they have a social media account.

Some other types of interactions between different social media platforms include, but are not limited to the following:
  including a link to social media content such as a post, photo or video from the second social media platform into a post on the first social media platform.
  including an entity mention (eg, user handle) from the second social media platform into a post on the first social media platform.
  including an entity mention (eg, user handle) from the second social media platform in the metadata (eg, "about" information) for an entity on the first social media platform.

Figure 18:
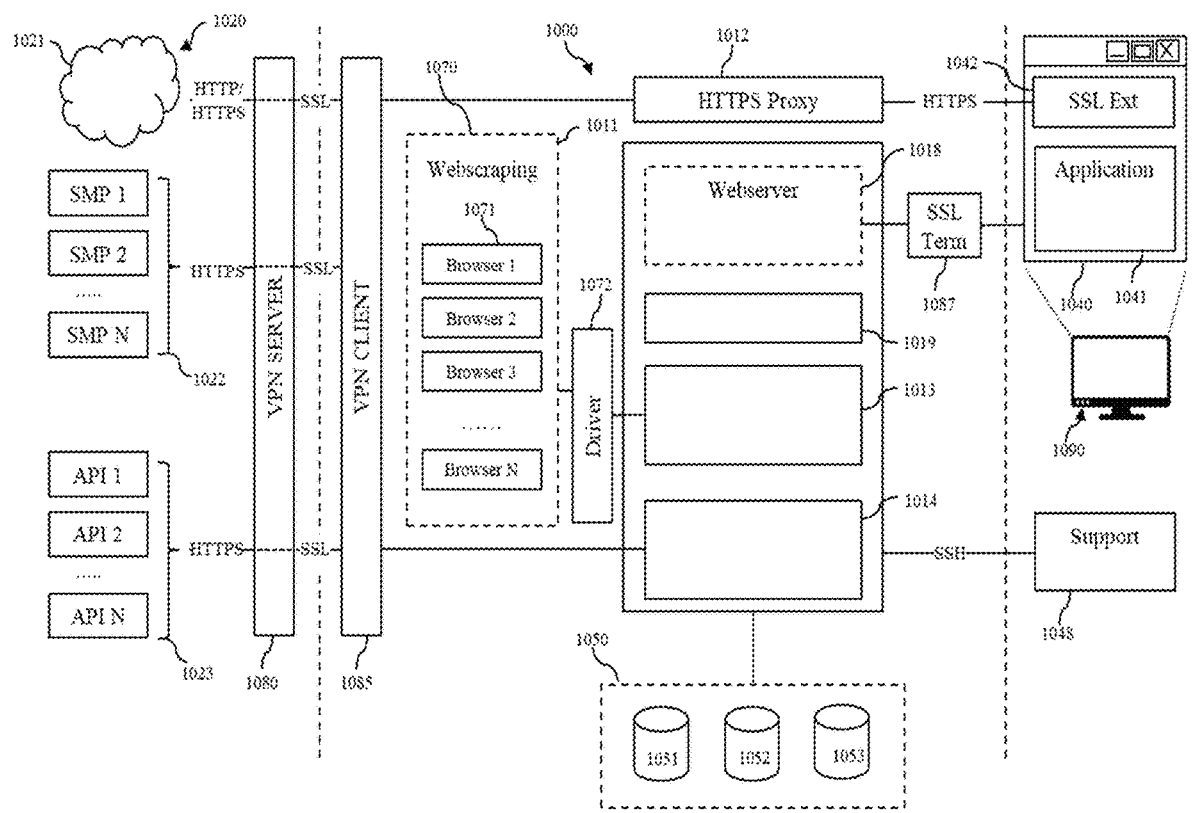
FIG. 18 is a system overview diagram of a risk profiling system 1000 for determining the risk profile of an entity of interest based on their social media presence according to another illustrative embodiment.

Referring now to FIG. 18, there is shown a system overview diagram of a risk profiling system 1000 for determining the risk profile of an entity of interest based on their social media presence according to another illustrative embodiment.

As would be appreciated the various computer modules, servers and databases and data stores described both above and below may be implemented on a computer system 1010 which may comprise any combination of multiple different individual hardware or software processors configured to run the various computing tasks that are described in functional terms below. In this illustrative embodiment, the computing system is based on a web architecture where the webserver 1018 functions to provide the middle tier between the Internet 1020 and the operator 1090 of the risk profiling system 1000. In this manner, the user interface 1040 of the risk profiling system 1000 consists of webpages or content served by the webserver and is accessed by a standard web browser as a "web" application 1041 by the operator 1090.

The web based architecture allows an operator 1090 to access the application from any device with a modern web browser, eg, a desktop PC or tablet. As such, this architecture does not require an operator 1090 to install specific software to use the application. It also provides flexibility when deploying the application as the server-side component may be deployed either on hardware managed by the operator's 1090 organisation, or in a cloud environment and managed on their behalf.

An alternative architecture that may be adopted for a web profiling system in accordance with the present disclosure is termed a "thick-client" architecture where the user interface is provided by a desktop application or app installed on the operator's device. This would still require a server component to support the functionality but can provide an enhanced user experience that is more integrated with the device capabilities or operating system that the application is installed on.

In this example, risk profile system 1090 includes a reverse proxy 1087 which functions as an intermediary between the operator 1090 who may be accessing the risk profiling system 1000 remotely by the Internet and the webserver application 1018 of the risk profiling system 1000. In this example, network traffic is secured between the user interface 1040 and reverse proxy 1087 by adopting the secure HTTPS (HTTPS) protocol while network traffic between webserver 1018 and the reverse proxy 1087 need not be encrypted as it is internal to the risk profiling system 1000 and uses the standard HTTP protocol. As would be appreciated, where the various components or server applications of the risk profiling system may be remotely distributed then network traffic between these components may be encrypted as required.

In this illustrative embodiment, the network traffic between the web application 1041 and the server 1018 employs a Representational State Transfer (REST) API that defines a set of messages and operations that can be exchanged over HTTP. This API is used to configure the risk profiling system 1000 and retrieve the results of the risk profile determinations. The REST API provides an interface to the risk profiling system 1000 and may be accessed by different user facing applications, eg, an iOS app could be developed that uses the same API calls as the web application 1041.

In this example, risk profiling system 1000 accesses the internet 1020 by a third party VPN provider that provides access to the Internet 1020 by a VPN server 1080 to which risk profiling system 1000 connects to by a VPN client 1085 forming in this example a component or module of the risk profiling system 1000. As a result, all of the network traffic between the internet 1020 and the risk profiling system 1000 may be encrypted by virtue of the secure socket layer (SSL) connection between the VPN client 1085 and the VPN server 1080 and the HTTPS links between the VPN server 1080 and the Internet 1020. In this example, an operator 1090 may also access the Internet generally through their access to the risk profiling system 1000 by the web browser based user interface 1040 as will be described below.

Risk profiling system 1000 communicates via the VPN Server/Client arrangement 1080, 1085 to interrogate social media platforms 1022 (eg SMP 1, SMP 2, . . . , SMP N) as described above. In this illustrative embodiment, risk profiling system 1000 can also connect to various cloud based application programing interfaces 1023 (eg, API 1, API 2, AMP N) to provide specialised based machine learning and artificial intelligence type processing available on the Internet to risk profiling system 1000. In one example, a cloud based API may provide a translation capability. In another example, a cloud based API may provide an image object classification capability. As well as ensuring all data communications to and from the Internet are encrypted, use of the VPN Server/Client arrangement 1080, 1085 also functions to obfuscate the source IP address of the risk profiling system 1000 to provide anonymity for risk profiling system 1000 and operator 1090.

Risk profiling system 1000 further includes an interrogation server 1011 operable to interrogate social media platforms 1022 as has been described above. In this embodiment, interrogation server 1011 comprises a webscraping module 1070 that can instantiate multiple instances of a web browser 1071. Webscraping module 1070 interfaces to the risk profiling system 1000 by a driver interface 1072 that processes interrogation requests from the risk profiling system 1000 into equivalent HTTP requests operable on each of the social media platforms 1022. In this manner, content is "scraped" from the social media platforms 122 for further processing.

In one example, the interrogation server 1011 employs user-provided credentials to access the social media platforms. These credentials can be an API key or a username and password for authenticating to the social media platform's web interface. For API keys, the application makes API requests to collect data from the social media platform. For credentials where there is a username and password, the webscraping module 1070 starts a web browser 1071 and programmatically controls it to login using the provided credentials, browse to the appropriate page and read content from the page. From the social media platform's perspective, the application appears to be a user browsing their service. This web-scraping collection method provides access to all content visible to a logged in user which may be more than would be available via API-based collection methods to the particular social media platform.

In one example, the content from the webscraping module 1070, and in particular the video and image data content, is stored on a distributed fault tolerant no-SQL database 151 that provides data distribution across a cluster of nodes for data replication purposes. In one example, database 151 is a RIAK based database. In other embodiments, the database could be a Redis key-value store or any S3-compatible object store.

In this example, risk profiling system 1000 further includes a HTTPS proxy server 1012 that allows the operator 1090 to connect to the Internet 1021 by VPN Server and Client 1080, 1085 arrangement using the same IP address as the risk profiling system 1000. In this example, the web browser employed by operator 1090 includes an SSL proxy extension or plugin 1042 which connects by HTTPS to the HTTPS proxy server 1012. As would be appreciated, this allows the operator 1090 to both securely and anonymously browse the general Internet 1020 while operating risk profiling system 1000, while presenting the same IP address as the risk profiling system 1000 to the social media platforms.

Risk profiling system 1000 includes a collection server 1013 that functions to process the content returned by webscraping module 1070 and stored in database 1051 as collected data items and then populate an entity data structure that corresponds to the entity of interest as has been described above. Collection server 1013, in this example, also functions to classify or identify collected data items as a social media activity and then further as a social media interaction where the social media activity concerns an interaction between the entity of interest and another social media account corresponding to another entity. In this example, the other social media account may be on a different social media platform (eg SMP 2) as compared to the social media platform that is being examined for the entity of interest (eg SMP 1).

Risk profiling system 1000 further includes a link analysis server 1014 that functions to generate the linked social network data structure assign the individual link risk measures and then determine the risk profile of the entity of interest as has been described above. In this example, the data associated with the entity data structure and the linked social network data structure determined by risk profiling system 1000 is stored in a no-SQL database 152 which in this example is a 3-node Elasticsearch™ cluster. Elasticsearch is a database or datastore optimised for searching large collections of semi-structured documents. Elasticsearch constructs an inverted index that allows the application to efficiently lookup content in text fields, eg, searching for a word in the text of posts on social media. The datastore supports "fuzzy" searches, eg, by synonyms or misspellings. In another example, the datastore is Solr™. In this example, link analysis server 1014 may connect to cloud based APIs 1023 to assist in the analysis task by VPN Server/Client arrangement 1080, 1085.

In this example, risk profiling system 1000, being based on a webserver architecture, also includes command and control module 1019, that functions to implement the risk profiling method in accordance with the present disclosure. Data associated with the application state of the risk profiling system 1000 such as processor status, pending task details and log and error data are stored in a standard relational database 1053. Risk profiling system 1000 in this embodiment further includes a support module 1048 that allows an operator to access the system through a SSH link to monitor and maintain the risk profile system 1000. The SSH connection allows an operator 1090 to login to the webserver 1018 from a remote location to facilitate maintenance. SSH access provides a terminal where the operator 1090 can execute commands to, eg, patch or reboot the webserver 1018. In one example, the web application 1041 provides an operator 1090 with an administrator role access to additional features that can support operational maintenance, eg, monitoring running tasks.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. In accordance with this, any of the servers described in the present disclosure may be implemented as logical processes on a single computer processor or alternatively distributed amongst a group of networked servers that are located and configured for cooperative functions.

Various embodiments of the systems and methods of the present disclosure may employ one or more electronic computer networks to promote communication among different components, transfer data, or to share resources and information. Such computer networks can be classified according to the hardware and software technology that is used to interconnect the devices in the network, such as optical fibre, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A computing system comprising:
one or more electronic processors; and
memory containing program instructions executable by the one or more electronic processors to cause the computing system to perform operations of webscraping software, a first storage, a collection server, a link analysis server, and a second storage;
wherein the webscraping software is configured to instantiate a browser, receive interrogation requests, convert the interrogation requests into content requests, transmit the content requests by way of the browser to one or more communication platforms, and store content from corresponding responses in the first storage;
wherein the collection server is configured to process the content from the first storage, identify data in the content that represent activities that took place in the one or more communication platforms and between a target username and other usernames, and store the data in the first storage; and wherein the link analysis server is configured to generate a linked data structure that associates the target username to each of the other usernames for which at least one unit of the data exists, generate respective measures from the linked data structure based on textual or image analyses of the activities between the target username and each of the other usernames, and store the linked data structure and the respective measures in the second storage;

wherein the interrogation requests characterize an entity, wherein the content requests refer to the entity as characterized, wherein the content includes one or more candidate usernames each respectively associated with candidate information, and wherein the webscraping software is further configured to:

rank the candidate usernames based on respective degrees of similarity between the entity as characterized and the candidate information; and select the target username based on the candidate usernames as ranked.

2. The computing system of claim 1, wherein the linked data structure includes respective links between the target username and each of the other usernames for which at least one unit of the data exists, and wherein the respective measures are associated with the respective links.

3. The computing system of claim 2, wherein the link analysis server is also configured to generate an aggregate measure based on the respective measures and store the aggregate measure in the second storage.

4. The computing system of claim 1, wherein the activities that took place in the one or more communication platforms between the target username and the other usernames comprise the target username and at least one of the other usernames interacting with common content on the one or more communication platforms.

5. The computing system of claim 1, wherein the textual or image analyses of the activities comprises determining a relevance of the activities in combination with a sentiment related to the activities.

6. The computing system of claim 1, wherein generating the respective measures from the linked data structure comprises determining respective initial measures between the target username and each of the other usernames based on connections between the target username and each of the other usernames on the one or more communication platforms.

7. The computing system of claim 1, wherein the one or more communication platforms include a social media platform.

8. The computing system of claim 7, wherein at least some of the target username and the other usernames relate to userids on the social media platform.

9. The computing system of claim 7, wherein generating the linked data structure comprises:

collecting, from the social media platform, units of data from a userid of the target username;

determining the units of data corresponding to social media activities; and determining social media interactions for the userid of the target username based on the social media activities that relate to interactions between the userid of the target username and userids of the other usernames.

10. The computing system of claim 9, wherein determining the units of data corresponding to the social media activities comprises comparing one of the units of data to a previous version of that unit of data to identify a change therein.

11. The computing system of claim 9, wherein the social media activities include one or more of posts, reposts, shares, comments, replies, joining groups, adding and removing connections, or reactions.

12. The computing system of claim 9, wherein the social media activities include one or more of a change in volume of produced content or interactions over a predetermined time, or a change in location.

13. The computing system of claim 1, wherein the respective measures are indicative of security threats.

14. A computer-implemented method comprising:

causing webscraping software to instantiate a browser, receive interrogation requests, convert the interrogation requests into content requests, transmit the content requests by way of the browser to one or more communication platforms, and store content from corresponding responses in a first storage;

causing a collection server to process the content from the first storage, identify data in the content that represent activities that took place in the one or more communication platforms and between a target username and other usernames, and store the data in the first storage; and causing a link analysis server to generate a linked data structure that associates the target username to each of the other usernames for which at least one unit of the data exists, generate respective measures from the linked data structure based on textual or image analyses of the activities between the target username and each of the other usernames, and store the linked data structure and the respective measures in a second storage;

wherein the interrogation requests characterize an entity, wherein the content requests refer to the entity as characterized, wherein the content includes one or more candidate usernames each respectively associated with candidate information, the method further comprising:

causing the webscraping software to rank the candidate usernames based on respective degrees of similarity between the entity as characterized and the candidate information, and select the target username based on the candidate usernames as ranked.

15. The computer-implemented method of claim 14, wherein the linked data structure includes respective links between the target username and each of the other usernames for which at least one unit of the data exists, and wherein the respective measures are associated with the respective links.

16. The computer-implemented method of claim 14, wherein generating the respective measures from the linked data structure comprises determining respective initial measures between the target username and each of the other usernames based on connections between the target username and each of the other usernames on the one or more communication platforms.

17. The computer-implemented method of claim 14, wherein the one or more communication platforms include a social media platform, wherein at least some of the target username and the other usernames related to userids on the social media platform, and wherein generating the linked data structure comprises:

collecting, from the social media platform, units of data from a userid of the target username;

determining the units of data corresponding to social media activities; and determining social media interactions for the userid of the target username based on the social media activities that relate to interactions between the userid of the target username and userids of the other usernames.

18. The computer-implemented method of claim 17, wherein the social media activities include one or more of a change in volume of produced content or interactions over a predetermined time, or a change in location.

* * * * *